United States Patent [19]
Howe et al.

[11] Patent Number: 6,135,502
[45] Date of Patent: Oct. 24, 2000

[54] REMOVABLE TRUCK MUD FLAP SYSTEM

[75] Inventors: Blair J. Howe; Chris M. Clark, both of Clio, Mich.

[73] Assignee: Charles H. Clark, Clio, Mich.; by said Blair Howe

[21] Appl. No.: 09/086,452

[22] Filed: May 28, 1998

[51] Int. Cl.[7] .................................................. B62B 9/14
[52] U.S. Cl. ...................... 280/847; 280/154; 280/154.5; 280/155; 280/848; 280/851
[58] Field of Search ................... 280/154.5, 154, 280/155, 847, 848, 851

[56] References Cited

U.S. PATENT DOCUMENTS

| | | | |
|---|---|---|---|
| 3,877,722 | 4/1975 | Conner | 280/154 |
| 3,899,193 | 8/1975 | Evans | 280/154.5 |
| 4,319,764 | 3/1982 | Whitaker | 280/154 |
| 4,712,805 | 12/1987 | McMillen | 280/154.5 |
| 4,726,599 | 2/1988 | Antekeier | 280/851 |
| 5,044,667 | 9/1991 | Manning | 280/851 |
| 5,121,944 | 6/1992 | Haddox | 280/851 |
| 5,833,254 | 11/1998 | Bucho | 280/851 |

*Primary Examiner*—Lanna Mai
*Assistant Examiner*—Toan To

[57] ABSTRACT

A replaceable mud flap system is provided including a rigid sleeve having a bottom face with a slot formed therein. The sleeve includes a hollow interior with a rectangular cross-section. An inboard end of the sleeve is perpendicularly coupled to a frame of a truck rearwardly of one of the tires thereof. An open outboard end allows communication with the hollow interior of the sleeve. An elastomeric flexible planar flap has a rigid guide coupled along a length thereof. The guide has a rectangular cross-section for being removably and slidably situated within the open outboard end of the sleeve such that the flap extends downwardly through the slot of the sleeve. An end cap is removably coupled to the outboard end of the sleeve for maintaining the flap within the sleeve.

5 Claims, 3 Drawing Sheets

REMOVABLE TRUCK MUD FLAP SYSTEM

BACKGROUND OF THE INVENTION

1. Field of the Invention

The present invention relates to removable mud flaps and more particularly pertains to a new removable truck mud flap system for more securely coupling a removable mud flap to a truck.

2. Description of the Prior Art

The use of removable mud flaps is known in the prior art. More specifically, removable mud flaps heretofore devised and utilized are known to consist basically of familiar, expected and obvious structural configurations, notwithstanding the myriad of designs encompassed by the crowded prior art which have been developed for the fulfillment of countless objectives and requirements.

Known prior art removable mud flaps include U.S. Pat. No. 5,044,667; U.S. Pat. No. 3,934,901; U.S. Pat. No. 5,121,944; U.S. Pat. No. Des. 330,692; U.S. Pat. No. Des. 338,863; and U.S. Pat. No. 4,572,532.

In these respects, the removable truck mud flap system according to the present invention substantially departs from the conventional concepts and designs of the prior art, and in so doing provides an apparatus primarily developed for the purpose of more securely coupling a removable mud flap to a truck.

SUMMARY OF THE INVENTION

In view of the foregoing disadvantages inherent in the known types of removable mud flaps now present in the prior art, the present invention provides a new removable truck mud flap system construction wherein the same can be utilized for more securely coupling a removable mud flap to a truck.

The general purpose of the present invention, which will be described subsequently in greater detail, is to provide a new removable truck mud flap system apparatus and method which has many of the advantages of the removable mud flaps mentioned heretofore and many novel features that result in a new removable truck mud flap system which is not anticipated, rendered obvious, suggested, or even implied by any of the prior art removable mud flaps, either alone or in any combination thereof.

To attain this, the present invention generally comprises a rigid sleeve having an outer surface with a square cross-section and defined by a top face, a bottom face, a pair of side faces and a pair of end faces. The sleeve further includes a hollow interior extending along an entire length thereof and situated only within a lower half thereof. The hollow interior has a constant vertical cross-section with a rectangular configuration. A thin recess is formed in an upper surface of the hollow interior along a length thereof. The bottom face has a thin slot formed along a length of a center line thereof in alignment with the thin recess. The thin slot further has a width similar to that of the thin recess. The sleeve includes an inboard end with a plate perpendicularly coupled thereto. A plurality of bores are formed in the plate for allowing the coupling of the sleeve to a frame of a truck rearwardly of one of the tires thereof. The sleeve further includes an open outboard end that allows communication with the hollow interior of the sleeve. Next provided is an elastomeric flexible planar flap having a rigid guide coupled along and slightly spaced from a top edge thereof. The guide has a rectangular cross-section for being removably and slidably situated within the open outboard end of the sleeve.

It should be noted that the rectangular nature of the hollow interior of the sleeve and the guide provide a secure coupling. As such, the flap extends downwardly through the slot of the sleeve. Further, the top edge of the flap remains within the thin recess of the sleeve. The flap has a width equal to that of the thin recess and thin slot of the sleeve for a secure fit. Finally, an end cap is provided including a square end face with a periphery coupled thereto and extending therefrom for defining an interior space and a side opening. The side opening is included for removably receiving the open outboard end of the sleeve. A pair of opposed side faces of the periphery each have a bore formed therein for allowing the insertion of pin therethrough. Such pin further extends through a corresponding bore formed in the guide to maintain the end cap in place.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new removable truck mud flap system apparatus and method which has many of the advantages of the removable mud flaps mentioned heretofore and many novel features that result in a new removable truck mud flap system which is not anticipated, rendered obvious, suggested, or even implied by any of the prior art removable mud flaps, either alone or in any combination thereof.

It is another object of the present invention to provide a new removable truck mud flap system which may be easily and efficiently manufactured and marketed.

It is a further object of the present invention to provide a new removable truck mud flap system which is of a durable and reliable construction.

An even further object of the present invention is to provide a new removable truck mud flap system which is susceptible of a low cost of manufacture with regard to both materials and labor, and which accordingly is then susceptible of low prices of sale to the consuming public, thereby making such removable truck mud flap system economically available to the buying public.

Still yet another object of the present invention is to provide a new removable truck mud flap system which provides in the apparatuses and methods of the prior art some of the advantages thereof, while simultaneously overcoming some of the disadvantages normally associated therewith.

Still another object of the present invention is to provide a new removable truck mud flap system for more securely coupling a removable mud flap to a truck.

Even still another object of the present invention is to provide a new removable truck mud flap system that includes a rigid sleeve having a bottom face with a slot formed therein. The sleeve includes a hollow interior with a rectangular cross-section. An inboard end of the sleeve is perpendicularly coupled to a frame of a truck rearwardly of one of the tires thereof. An open outboard end allows communication with the hollow interior of the sleeve. An elastomeric flexible planar flap has a rigid guide coupled along a length thereof. The guide has a rectangular cross-section for being removably and slidably situated within the open outboard end of the sleeve such that the flap extends downwardly through the slot of the sleeve. An end cap is removably coupled to the outboard end of the sleeve for maintaining the flap within the sleeve.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
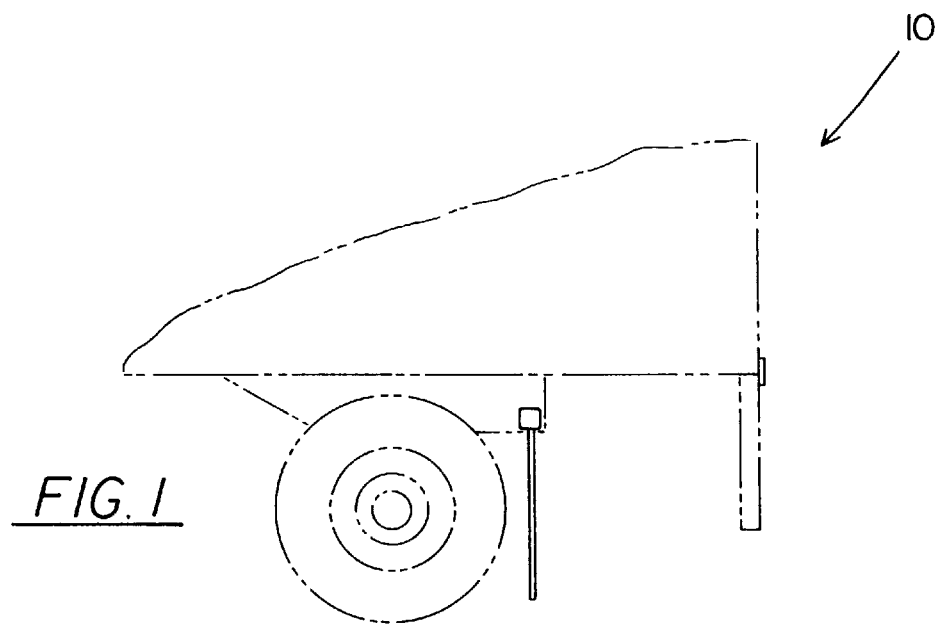
FIG. 1 is a side view of a new removable truck mud flap system according to the present invention.
Figure 2:
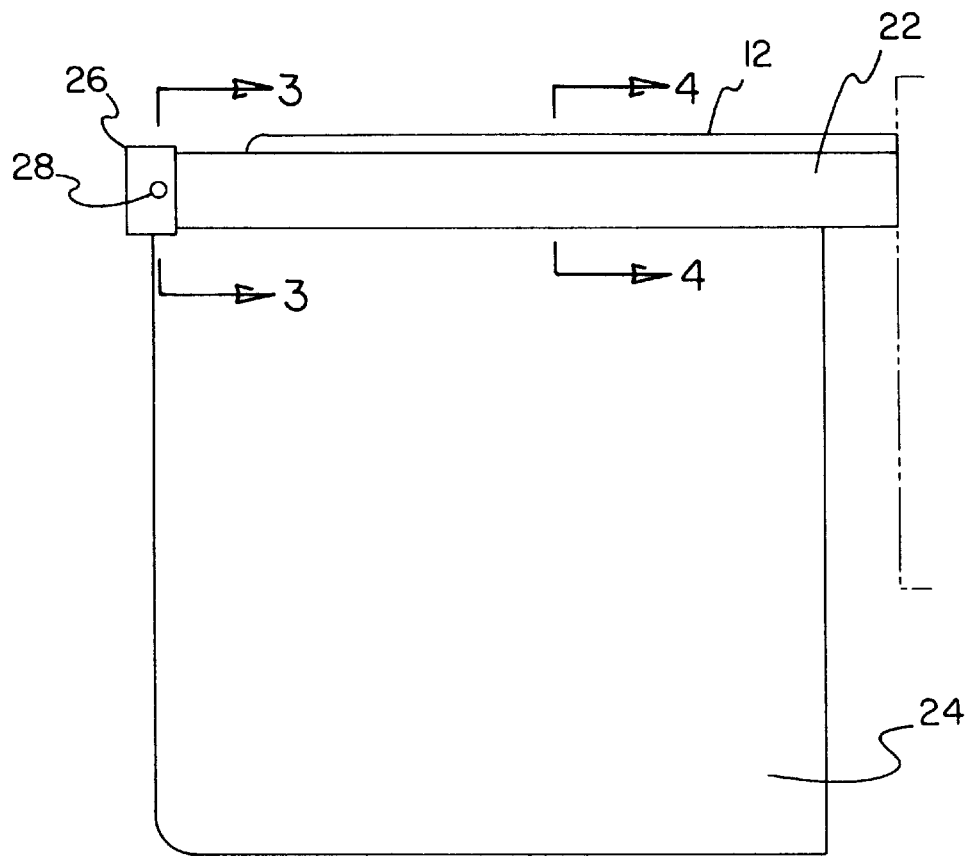
FIG. 2 is a rear view of the present invention.
Figure 3:
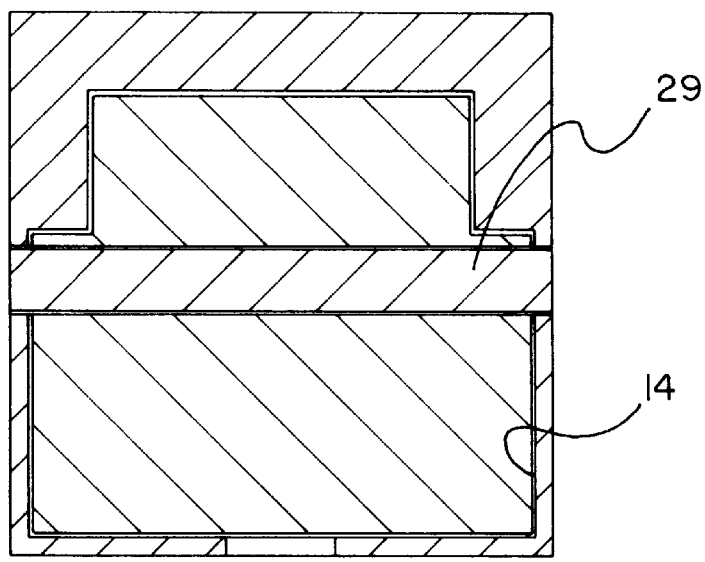
FIG. 3 is a cross-sectional view of the end cap and sleeve of the present invention taken along line 3—3 shown in FIG. 2.
Figure 4:
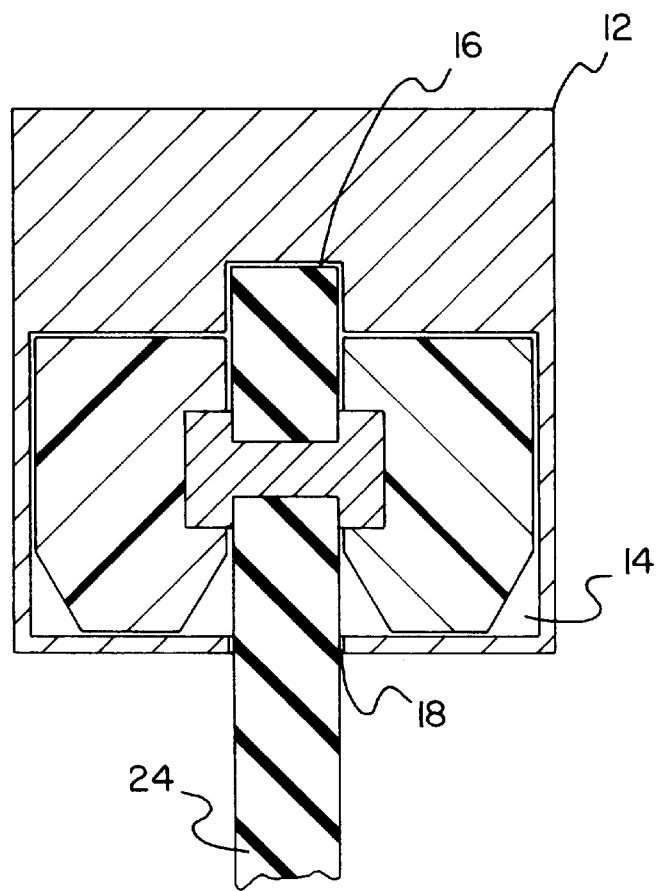
FIG. 4 is a cross-sectional view of the guide and sleeve of the present invention taken along line 4—4 shown in FIG. 2.
Figure 5:
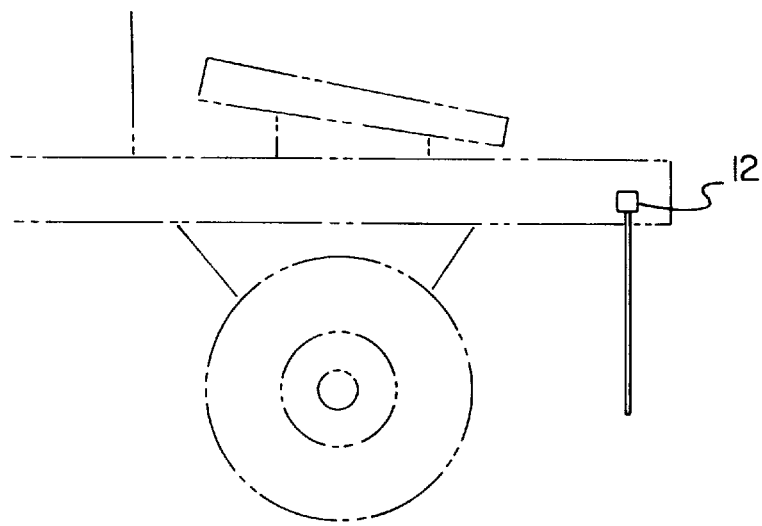
FIG. 5 is a side view of another embodiment of the present invention.
Figure 6:
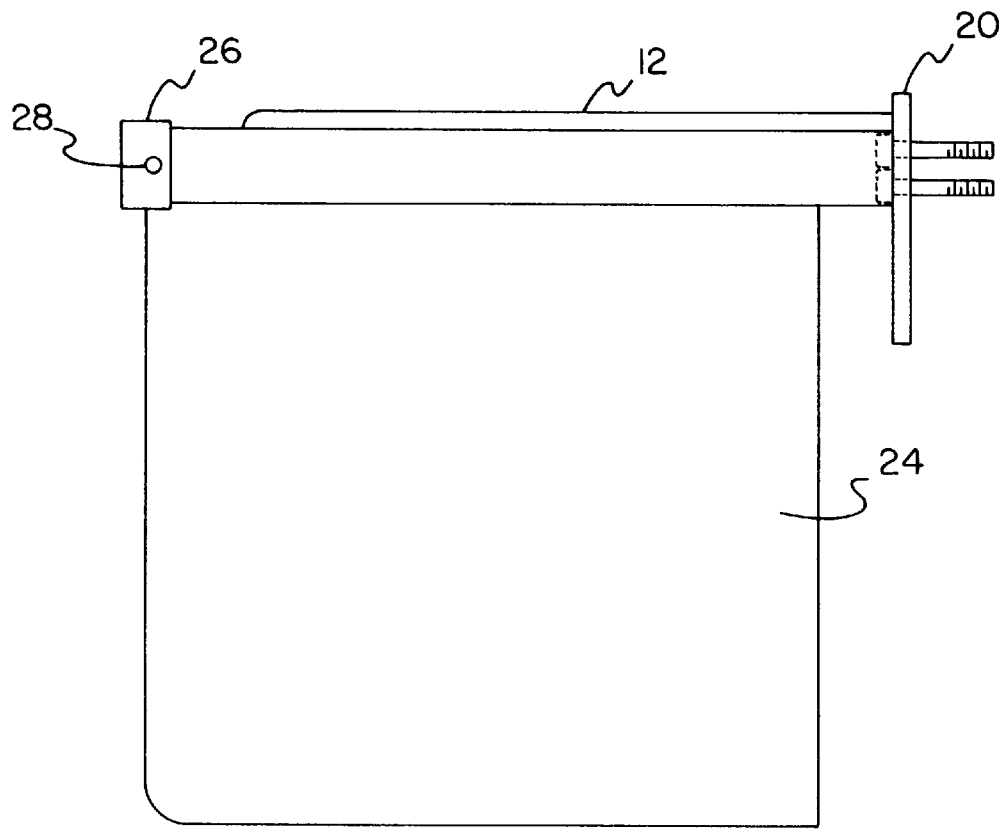
FIG. 6 is a rear view of the embodiment of the present invention shown in FIG. 5.

With reference now to the drawings, and in particular to FIGS. 1 through 6 thereof, a new removable truck mud flap system embodying the principles and concepts of the present invention and generally designated by the reference numeral 10 will be described.

The present invention, designated as numeral 10, includes a rigid sleeve 12 having an outer surface with a square cross-section and defined by a top face, a bottom face, a pair of side faces and a pair of end faces. In the preferred embodiment, the sleeve is linear along its entire length. Note FIG. 4. The sleeve further includes a hollow interior 14 extending along an entire length thereof and situated only within its lower half. The hollow interior has a constant vertical cross-section with a rectangular configuration. A thin recess 16 is formed in an upper surface of the hollow interior along a length thereof. The bottom face has a thin slot 18 formed along a length of a center line thereof and in alignment with the thin recess. The thin slot further has a width similar to that of the thin recess. In the preferred embodiment, the width of the thin slot is about ¼ that of the bottom face of the sleeve. Further, for reasons that will become apparent hereinafter, the thin slot and recess preferably cease short of an inboard end of the sleeve.

The inboard end has a planar rectangular plate 20 perpendicularly coupled thereto. A plurality of bores are formed in the plate for allowing the coupling of the sleeve to a frame of a truck rearwardly of one of the tires via a plurality of bolts. See FIG. 6. In another embodiment shown in FIG. 2, the sleeve is coupled to a 1×¼ inch flat stock 22 along a length of its top face. The sleeve further includes an open outboard end that allows communication with the hollow interior of the sleeve.

Next provided is an elastomeric flexible planar flap 24. A rigid guide is coupled along and slightly spaced from a top edge of the flap. The rigid guide comprises a pair of elongate guide members 30, 31, with each guide member being positioned on a side of the flap opposite of the other of the guide members. The guide members are preferably secured by a rivet 25 to the flap. The guide members 30, 31 each have a generally rectangular cross-section for being removably and slidably situated within the open outboard end of the sleeve. Note FIG. 4. The only exception to such rectangular nature is the tapered lower ends of the guide members. It should be noted that the rectangular nature of the hollow interior of the sleeve and the guide members provide a secure coupling. During use, the flap extends downwardly through the slot of the sleeve. Further, the top edge of the flap remains within the thin recess of the sleeve. It should be noted that the flap has a thickness equal to that of the thin recess and thin slot of the sleeve for a secure fit.

Finally, a rigid end cap 26 is provided including a square end face with a periphery coupled thereto and extending therefrom for defining an interior space and a side opening. The side opening is included for removably receiving the open outboard end of the sleeve. A pair of opposed side faces of the periphery each have a bore 28 formed therein for allowing the insertion of pin 29 therethrough. Such pin further extends through a corresponding bore formed in the guide, flap, and sleeve to maintain the end cap in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A replaceable mud flap system comprising, in combination:

a rigid sleeve having an outer surface with a square cross-section and defined by a top face, a bottom face, a pair of side faces and a pair of end faces, the sleeve further including a substantially solid upper portion for enhancing the rigidity of the sleeve, and a substantially hollow lower portion extending along an entire length of the sleeve, the hollow lower portion having a constant vertical cross-section with a rectangular configuration, a thin recess formed in a top surface of the hollow interior along a length thereof for receiving a top edge of a flap, the bottom face having a thin slot formed along a length of a center line thereof in alignment with and having a similar width as that of the thin recess for receiving a portion of a flap spaced from the upper edge of the flap, the sleeve including an inboard end with a plate perpendicularly coupled thereto with a plurality of bores formed therein for allowing the coupling of the sleeve to a frame of a truck, the sleeve further including an outboard end that allows communication with the hollow interior of the sleeve;

an elastomeric flexible planar flap having a top edge;

a rigid guide mounted on the flap for enhancing the rigidity of a top region of the flap, the rigid guide comprising a pair of elongate guide members, each guide member being positioned on a side of the flap opposite of the other of the guide members and extending along the top edge of the flap in a position slightly spaced from the top edge, each of the guide members having a substantially rectangular cross-section removably and slidably situated in the hollow lower portion of the sleeve for resisting rotation of the guide members with respect to the sleeve, the flap extending downwardly through the slot of the sleeve and the top edge of the flap being positioned in the thin recess of the sleeve such that the flap is engaged by the sleeve at spaced locations on opposite sides by the guide members for resisting rotation of the flap with respect to the sleeve, wherein the flap has a width equal to that of the thin recess and thin slot of the sleeve; and an end cap including a square end face with a periphery coupled thereto and extending therefrom for defining an interior space and a side opening for removably receiving the outboard end of the sleeve, a pair of opposed side faces of the periphery each having a bore formed therein for allowing the insertion of pin therethrough which extends through a corresponding bore formed in the guide to maintain the end cap in place.

2. A replaceable mud flap system comprising:

a rigid sleeve including a bottom face having a slot formed therein, the sleeve including a substantially hollow lower portion with a rectangular cross-section, the slot being in communication with the substantially hollow lower portion, an inboard and for mounting to a frame of a truck, and an outboard end that allows communication with the hollow interior of the sleeve;

an elastomeric flexible planar flap having a top edge; and a rigid guide mounted on the flap for enhancing the rigidity of a top region of the flap, the rigid guide comprising a pair of elongate guide members each guide member being positioned on a side of the flat opposite of the other of the guide members and extending along a length of the top edge in a position spaced from the top edge of the flap, each of the guide members having a substantially rectangular cross-section for being removably and slidably situated in the hollow lower portion of the sleeve for resisting rotation of the guide members with respect to the sleeve, the flap extending downwardly through the slot of the sleeve;

wherein the upper portion of the rigid sleeve includes a recess for receiving a top edge of the flap which extends above the guide members for resisting rotation of the flap between the guide members with respect to the sleeve.

3. A replaceable mud flap system as set forth in claim 2 wherein a pin is removably situated within bores formed in the sleeve, the guide and the cap.

4. A replaceable mud flap system as set forth in claim 2 wherein an upper portion of the sleeve is substantially solid for enhancing the rigidity of the sleeve.

5. A replaceable mud flap system as set forth in claim 2 wherein the inboard end of the sleeve is perpendicularly coupled to a planar plate for coupling to the frame of a truck.

* * * * *